Oct. 11, 1932.  W. P. KELLETT  1,882,501
POWER PLANT FOR TRANSPORT VEHICLES
Filed Jan. 25, 1930

Inventor
William Platts Kellett

Patented Oct. 11, 1932

1,882,501

UNITED STATES PATENT OFFICE

WILLIAM PLATTS KELLETT, OF NEW YORK, N. Y.

POWER PLANT FOR TRANSPORT VEHICLES

Application filed January 25, 1930. Serial No. 423,493.

The principal object of the invention is to provide a power plant for use on transport vehicles which will utilize the kinetic energy of the vehicle when moving on down grades to create and store power to be used for various purposes.

A further and important object is to provide means whereby the motive power for moving the vehicle will be utilized under emergency conditions to operate the units installed on the vehicle.

A still further object is to devise a unit for use in closed storage containers which will maintain a uniform temperature within the container in transit and which will effect a marked saving in operating cost and demurrage charges.

The principal features of the invention consist in introducing into the electric circuit of a generator unit, operated from the running gear of the vehicle, switch devices which will connect the electrical load on to the generator when the vehicle is running down grade and will automatically disconnect said load upon the motive power for operating the vehicle being utilized, but which will cut in the generator in the event of the power storage on the vehicle being depleted.

A further and important feature consists in the novel construction and arrangement of heat exchange units and power storage and operating units in a storage container whereby the units will automatically utilize power stored on the vehicle to maintain the temperature within the container within fixed limits.

Figure 1:
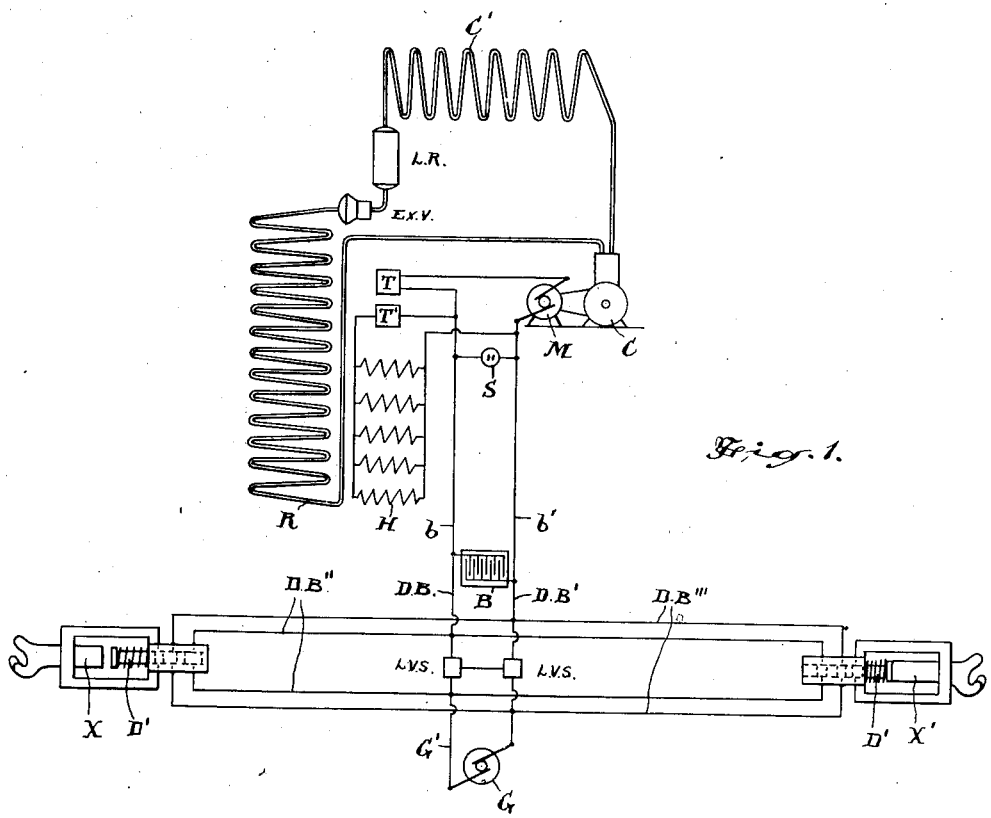

In the accompanying drawing Figure 1 is a diagrammatic representation of an application of the invention to a railway car, the container of which is provided with refrigerating and heating units.

Figure 2:
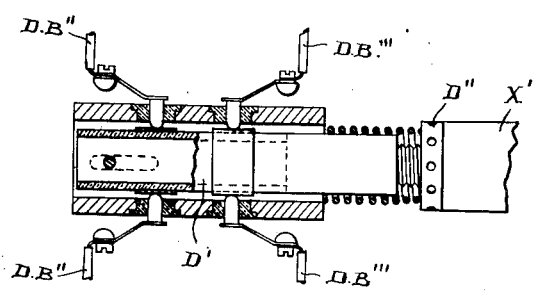

Figure 2 is an enlarged sectional detail illustrating an arrangement of contacts controlled by the movement of the draw bars.

The transportation of perishable products over long distances and through areas of varying temperatures is a problem involving many difficulties, and many variable conditions have rendered the cost of such transportation extremely high. Mechanical refrigeration has been proposed to overcome many of the difficulties of ice cooling but the use of the locomotive as the power plant for mechanical refrigeration is practically prohibitive where a number of cars or an entire train of refrigerator cars are to be operated.

The present invention proposes the mechanical refrigeration and heating of cars and the storage of power on cars by utilizing the kinetic energy developed by the movement of the cars on down grades so that the locomotive or motive power for moving the vehicles will not be burdened with the load.

In carrying this invention into effect, the car, whether a railway car or a trailer vehicle carrying a goods container is equipped with an electric generator G and storage battery B with any suitable equipment of regulating and control devices as are commonly used in car lighting equipment.

The circuit G′ between the battery and the generator is interrupted by low voltage switches L. V. S. which are normally open.

A pair of leads D B and D B′ are connected to the opposite leads between the generator G and battery B at either side of the switches L. V. S. and switch members D and D′ arranged at opposite ends of the car are arranged to close the circuit leads DB″ and DB‴ when the drawbars $w$ or $w'$ are pressed inwardly through the pressure of the car and its load when moving on a down grade so that current from generator G passes by way of leads DB″ and DB‴ to leads DB and DB′ respectively. The switches D and D′ are here shown of a spring plunger type each provided with dual contacts to close the circuit leads DB″ and DB‴ connected with the leads D B and D B′ when pushed inwardly against their springs by the draw bars but when the drawbar pressure is released the springs automatically move said switches to open the circuits. These plungers are not attached to the draw bars and do not follow same to the limit of their outward movement but may be adjusted for any desirable movement. This adjustment may be set or provision may be made for adjusting the length of movement in accordance with the variation in draw bar movement due to the position of the car in the train. Many different forms of adjustment may be devised and the arrangement shown in Figure 2 illustrates one manner in which such adjustment may be provided for, the draw-bar-engaging portion D″ being threaded or telescopically arranged in the plunger switch D′ so that the switch may be made to operate only when a predetermined pressure on the draw bars is reached.

It will be understood that as the draw bar switches are normally open, when the motive power is pulling upon the draw bars the generator G will not be under load and it will therefore not produce a braking effect or load upon said motive power but when the car is moving on a down grade the draw bars move inwardly and close the eletrical circuit of the generator and the power generated is stored in the battery B.

Leads $b$ and $b'$ from the battery, as shown in the accompanying diagram extend into the goods compartment and are connected to thermostatic switches T and T′. These are preferably arranged close together within the compartment where the goods are stored. The switch T connects with the leads $b$ and $b'$ across the terminals of motor M and is adapted to close the electrical circuit to operate the motor when the temperature within the compartment rises to a predetermined point. The motor is operatively connected with the compressor C of a refrigerating unit and compresses the refrigerating gas which flows through the condenser coil C′ and liquid receiver L R to the thermostatic expansion valve Ex. V. The cooled refrigerating liquid is expanded into the refrigerating coil R which absorbs the heat of the compartment and returns to the compressor.

The thermostatic switch T′ which is connected across the leads $b$ $b'$ is set to operate at a predetermined low temperature to close an electric circuit through a heater H.

The range between the points of operation of the switches T and T′ is regulated so that a refrigerator car starting out in a hot country will be maintained to a desired low temperature but in the event of the car being carried to a country where a very low temperature obtains the interior temperature will be maintained against the outer temperature.

It will be understood that by utilizing the kinetic energy of the load of the cars the motive power will be relieved of the load of the electrical pull but in the event of the power storage being depleted in a car, the low voltage switches L. V. S. operate to close the generator circuit thus utilizing the motive power to prevent the loss of heat exchange.

It will be understood that where heavy refrigerator traffic exists cars are frequently returned empty and this arrangement of the uses of the kinetic energy, which otherwise is wasted, enables the cars being delivered pre-cooled which thus effects a great saving in demurrage as well as cost in cooling before the cars are again loaded.

The invention has been particularly described as applied to the operation of heat exchange units, but it will be readily appreciated that the storage of power may be effected for use in operating other mechanisms, such for instance, as the operation of the generator as a motor to assist in the propulsion of the vehicle in grade climbing.

In the arrangement shown, provision is made by a shunt S for plugging in an outside circuit at terminals to charge the batteries or to maintain the temperature of a car while standing.

The system herein described is very simple in principle and may be applied at quite reasonable cost and will be mainly standard equipment.

Such a system will be readily applicable to the separate container type of transportation unit as the storage power unit may be connected to separate heat exchange units in the several containers on a car.

What I claim as my invention is:—

1. A power plant for transport vehicles, comprising the combination with an electric generator operatively connected with the running gear of the vehicle, a storage unit, and a generator circuit interposed between said generator and storage unit of draft-controlled means adapted to close the generator circuit to utilize the kinetic energy of the load moving down grade and to open the generator circuit when the load is being pulled.

2. A power plant for transport vehicles, comprising the combination with an electric generator operatively connected with the running gear of the vehicle, a storage unit, and draw bars on the vehicle, of an electric switch adapted to close the generator circuit and operated by the inward movement of the draw bar effected by the pressure of the load when the vehicle is moving on a down grade.

3. A power plant for transport vehicles, comprising the combination with an electric generator operatively connected with the running gear of the vehicle, a storage unit, a generator circuit interposed between said storage unit and generator, and draw bars on the vehicle, of spring plunger switches connected with said generator circuit for controlling the opening and closing of same, said switches being arranged adjacent to the draw bars and normally held open when pull is exerted on the draw bars and adapted to be closed by the inward movement of the draw bars when the load of the vehicle is exerted against the draw bar in running down grade.

4. A power plant for transport vehicles, comprising the combination with an electric generator operatively connected with the running gear of the vehicle, a storage unit, and draw bars on the vehicle and a generator circuit interposed between the generator and storage unit, of an electric switch adapted to close the generator circuit and operated by the inward movement of the draw bar effected by the pressure of the load when the vehicle is moving on a down grade, and means interposed in the generator circuit for closing same independent of the switches operated by the draw bars when the stored energy is depleted.

5. A power plant for transport vehicles, comprising the combination with an electric generator operatively connected with the running gear of the vehicle, a storage unit, and a generator circuit interposed between the generator and storage unit, said vehicle having draw bars of low voltage switches interposed in the generator circuit between the generator and the battery maintaining an open circuit while the battery retains normal voltage, branch circuits leading from both sides of the low voltage switches, and mechanically operated switches arranged in said branch circuits adapted to be operated to close said circuits by the inward movement of the draw bars.

6. In a power plant for transport vehicles the combination of an electric generator operated from the running gear of the vehicle, a storage battery receiving current from said generator, movable draw bars on said vehicle, and means including switches each actuated by the movement of a separate one of said draw bars relative to said vehicle for effecting a duplicate control of the current output from said generator.

7. In a power plant for transport vehicles the combination of an electric generator operated from the running gear of the vehicle, a storage battery receiving current from said generator, movable draw bars on said vehicle, means including switches adapted to be controlled by the movement of said draw bars for controlling the current output from said generator, and switch actuating means interposed between said switches and draw bars adapted to be engaged by the latter to operate said switches on the movement of the draw bars a predetermined distance.

8. In a power plant for transport vehicles the combination of an electric generator operated from the running gear of the vehicle, a storage battery receiving current from said generator, movable draw bars on said vehicle, means including switches adapted to be controlled by the movement of said draw bars for controlling the current output from said generator, and switch actuating means interposed between said switches and draw bars adapted to be engaged by the latter to operate said switches on the movement of the draw bars a predetermined distance, said switch actuating means being adjustable relative to said draw bars to adapt the same to load conditions.

9. In a transportation power plant the combination of a plurality of articulated mobile units flexibly connected together and having a limited movement in a draft direction relative to each other, electric generators carried by said articulated mobile units and operated by the running gear thereof, means absorbing the current output of said generators, and means controlled by relative displacement of said mobile units for controlling the output of said generators.

10. In a transportation power plant the combination of a plurality of articulated mobile units flexibly connected together and having a limited movement in a draft direction relative to each other, electric generators carried by said articulated mobile units and operated by the running gear thereof, storage units, circuit leads extending between said storage units and said generators, and switch means controlled by the relative displacement of said mobile units in a draft direction controlling the opening and closing of said circuit leads.

WILLIAM PLATTS KELLETT.